Sept. 16, 1958     T. FLATOW     2,851,784
INCLINOMETER
Filed Feb. 20, 1956
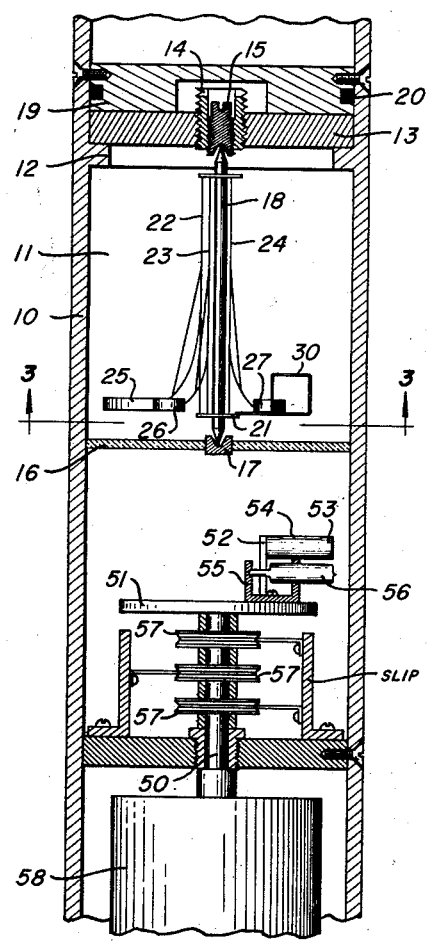
FIG. 1.
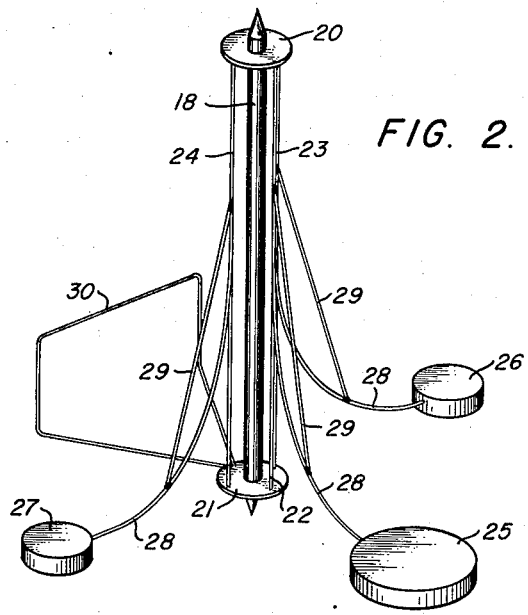
FIG. 2.
FIG. 3.
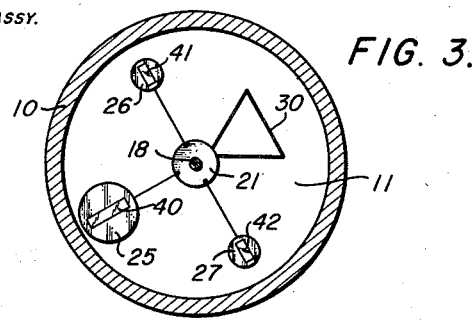
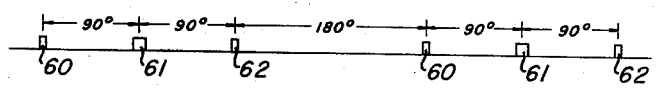
FIG. 4A.
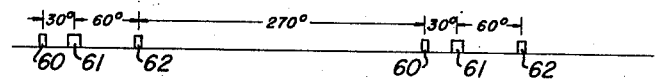
FIG. 4B.
INVENTOR.
Tobias Flatow,
BY Frank S. Troidl
ATTORNEY

United States Patent Office 2,851,784
Patented Sept. 16, 1958

2,851,784

INCLINOMETER

Tobias Flatow, Houston, Tex., assignor, by mesne assignments, to Jersey Production Research Company Application February 20, 1956, Serial No. 566,619

7 Claims. (Cl. 33—205)

This invention relates to a new and improved apparatus for determining the direction and amount of inclination of an object from a vertical position. More particularly, this invention relates to an improved apparatus for determining, at the surface of the earth, the inclination and direction of inclination of a well logging instrument or similar device while it is in a well bore at any desired depth.

In measuring the inclination and direction of inclination of an instrument it is current practice to include within the instrument, the inclination and direction of inclination of which is to be measured, an inclinometer. Currently utilized inclinometers include therein a weight or pendulum which is connected to a support. These currently utilized inclinometers might also include therein a second weight, such as an eccentric weight, which assumes the same direction as the direction of inclination of the instrument. However, it has been found that in practice the friction opposing the movement of the weights is large enough in magnitude to interfere with the accurate determination of the amount of inclination of devices, such as well logging devices. The friction often is so great as to prevent movement of the pendulum if the direction of inclination of the device changes by a small amount, such as a few degrees. It would be highly desirable therefore to provide the inclinometer art with an inclinometer which effectively overcomes the frictional forces inherent in current utilized inclinometers.

Briefly described, my new instrument for indicating the direction and amount of inclination includes a housing in which is mounted a rotatable, elongated member parallel to the sides of the housing. A weight is attached to the rotatable elongated member by means of a flexible member such as a flexible ribbon. The term "flexible member" as used herein means a member which may be twisted as distinguished from a member which is rigid or is normally thought of as not being subject to being twisted without fracturing. The elongated member is mounted in bearings contained within a housing. As the direction of inclination of the housing changes, the force of gravity tends to swing the weight to the new direction of inclination and hence to rotate the elongated member correspondingly. However, friction in the bearings supporting the elongated member opposes rotation of the member. By utilizing a flexible member for mounting the weight, when a change in direction of inclination occurs, the weight can begin to realign itself without first requiring that the friction restraining the elongated member be overcome. Then, as the weight moves, twist develops in the flexible member. This twist and the momentum of the swinging weight will then overcome the restraining friction on the elongated member, and this member will rotate toward the new direction of inclination of the housing.

If it is desired to ascertain the amount of inclination of the housing as well as the direction of inclination of the housing a second flexible member may be attached to the rotatable, elongated member with the second flexible member being circumferentially separated from the first flexible member. A minor mass or weight is attached to the second flexible member with the azimuthal angle between the major mass or weight and the minor mass or weight giving an indication of the degree of inclination of the housing. If desired, a second minor weight may be attached to a second flexible member which flexible member is also connected to the rotatable, elongated member. If the torsion constant of the flexible member supporting one minor weight is greater than the torsion constant of the other flexible member to which the other minor weight is attached, the minor weight attached to the flexible member having the greater torsion constant may be utilized to indicate large changes in the amount of inclination, and the minor weight attached to the flexible member having the smaller torsion constant utilized to indicate small changes in amount of inclination.

Other objects and a fuller understanding of the invention may be had by referring to the following description and claims, taken in conjunction with the accompanying drawings in which:

Fig. 1 is an elevational view partly in section of one embodiment of apparatus employing the present invention;

Fig. 2 is a perspective view showing a preferred embodiment of my new inclinometer;

Fig. 3 is a view taken along lines 3—3 of Fig. 1; and

Figs. 4A and 4B show examples of records obtained utilizing my new inclinometer.

Referring to the drawings, particularly to Fig. 1, numeral 10 refers to a housing in which is mounted an inclinometer indicated generally by the numeral 11. Provided within the housing 10 is a circular shoulder 12 upon which is mounted a cross member 13. Cross member 13 has a grooved bore therein into which is inserted a quick adjustment member 14 and a fine adjustment member 15. Longitudinally spaced from cross member 13 is a transparent member or plate 16 which might consist of glass or any other transparent material. Mounted within the transparent plate 16 is a pivot socket 17 adapted to receive the tapered end of an elongated, rotatable member 18. The other end of the elongated, rotatable member 18 is also tapered and fits into a concave pivot screw socket provided within fine adjustment member 15. The space defined by the cross member 13 and the transparent plate 16 is entirely filled with a dampening fluid to dampen the movements of the inclinometer 11. To seal in the dampening fluid a grooved member 19, having located within its groove an O-ring 20, is provided.

The moving parts of the inclinometer 11 are shown in more detail in Fig. 2. As shown in Fig. 2, provided adjacent each longitudinal extremity of the rotatable, elongated member 18 is an upper end plate 20 and a lower end plate 21. Connected to each of the end plates 20 and 21 and extending longitudinally between said end plates are three flexible members 22, 23 and 24. The flexible members 22, 23 and 24 are subject to being twisted and hence may consist of any desired flexible material of any desired shape. A preferred embodiment, however, consists of ribbons such as shown. Attached to ribbon 22 is a major weight 25; attached to ribbon 23 is a minor weight 26; and attached to ribbon 24 is a second minor weight 27. Major weight 25 and minor weights 26 and 27 may be connected to their respective flexible ribbons by means of curved wires 28 and diagonal wires 29 to maintain the weights radially spaced from shaft 18. Though the weights 25, 26 and 27 are shown in the figures as being circular in shape, it is to be understood that the weights, if desired, may be of any shape, the only requirement being that the major weight 25 be larger than the minor weights 26 and 27.

The entire sensitive inclinometer weighs only a few ounces, yet is rugged and reliable. The ribbons 22, 23 and 24 are about .001 inch thick and .010 inch wide, the actual dimensions depending on the torsion constant desired. Ribbon 22 to which is attached the major mass 25 is larger than that of the other ribbons 23 and 24 in order to have a larger torsion constant. The curved wires 28 and diagonal wires 29 may be of rolled barium coarse wire and about .005 inch in diameter. Ribbons 22, 23 and 24 are parallel to the rotatable, elongated member 18 and are attached to the end plates 20 and 21 at points circumferentially spaced about 90°. It is to be understood, however, that though the ribbons are shown in the figures as being circumferentially spaced apart 90° any other spacing could be utilized, if desired. However, it is necessary, for the proper operation of the device, that one minor mass be located on either side of the major mass 25.

In operation, as the housing 10 is lowered through the borehole major mass 25 tends to assume the same azimuthal direction as the direction of inclination. The minor masses are small enough with respect to the major mass so that their effect on the alignment of the inclinometer will be negligible. If mass 25 is rigidly attached to the rotatable elongated member 18 the force of gravity on weight 25 must overcome the friction at the pivot points of the rotatable elongated member 18. However, with the provision of the flexible member 22 the movement of weight 25 twists the flexible member 22 so that the weight can begin to realign itself before any torque is exerted upon the end plates 20 and 21, which will tend to rotate the end plates. The force exerted against the friction of the pivot points is proportional to the angular change in the direction of inclination. In conventional inclinometers, if there is a small angular change of a few degrees or less, this force is often not great enough to overcome the frictional force and hence no movement of the major weight is occasioned resulting in unreliable recordings of direction of inclination. However, my new inclinometer overcomes this disadvantage because the momentum of weight 25 will cause the flexible member or ribbon 22 to twist in an angular direction toward the direction of inclination and hence tend to increase the force utilized to overcome the friction, resulting in an accurate determination of the direction of inclination.

The degree of inclination is also obtained in a manner different from conventional inclinometers. In conventional inclinometers a pendulum or other means is utilized which is centered in the housing when there is no inclination and moves outwardly from the axis of the housing an amount proportional to the degree of inclination. My new inclinometer operates in a different fashion. Both of the minor weights 26 and 27 are maintained a substantially constant radial distance from the axis of the housing 10 by means of the curved wires 28. However, because of the flexible ribbons 23 and 24 to which weights 26 and 27, respectively, are attached, weights 26 and 27 will move in an arcuate path toward the direction of inclination of housing 10. If there is zero or no inclination, weights 26 and 27 will remain 90° apart from major mass 25. If there is an inclination, minor weights 26 and 27 are moved arcuately toward major mass 25 an amount proportional to the degree of inclination. It is to be understood that only one minor mass or weight is necessary for my new instrument to operate efficiently as an inclinometer. However, by utilizing more than one minor weight both a "high" and a "low" sensitivity scale can be obtained by using ribbons of different torsion constant for weights 26 and 27. The displacement of each of these weights from the major weight 25 can be calibrated in terms of inclination. For example, if ribbon 23 is "twice as stiff" as ribbon 24, weight 26 will move only half as far as weight 27 for the same amount of inclination. Hence, the amount of displacement of weight 26 can be utilized to get an indication of large amounts of changes in inclination, and weight 27 for slight changes in inclination.

As explained previously one important feature of my new inclinometer is that upon movement of housing 10 the weights 25, 26 and 27 move prior to movement of the rotatable elongated member or shaft 18. However, a difficulty could result from this feature because both minor masses might initially swing in such a direction as to wind up on the same side of the major weight 25. No reliable readings of the amount of inclination would then be available. To prevent the minor masses 26 and 27 from possibly initially being on the same side of major mass 25, a guard member 30 is provided. The guard member 30 which may suitably be a wire bracket is mounted on the lower end plate 21 at a point circumferentially between the ribbons 23 and 24.

As shown in Fig. 3, mounted on the bottom of major weight 25 and minor weights 26 and 27 are reflecting members such as mirrors 40, 41 and 42, respectively. The mirrors are provided so as to reflect light from a light source onto a photocell with the resulting signals from the photocell being transmitted to the surface of the earth and recorded. To this end there may be combined, with the inclination responsive elements described above, photoelectric means similar to the means disclosed by A. B. Hildebrandt in U. S. Patent 2,614,334 issued October 21, 1952.

Mounted within housing 10 (see Fig. 1) upon a rotatable shaft 50 is a table member 51 and a bracket 52 carrying an electric lamp within a lamp shield 53 secured upon table member 51 in a position such that light from the lamp may pass through a slit 54 in shield 53 and shine upon the mirrors 40, 41 and 42 when shaft 50 is rotated. Also secured to the table member 51 is a bracket 55 carrying a photosensitive cell 56 in a fixed relation to the light source 53. Photosensitive cell 56 is positioned relative to the light source 53 and mirrored surfaces 40, 41 and 42 so that during some portion of each revolution of shaft 50 and table member 51 said cell will receive light reflected from each of the mirrored surfaces. A plurality of slip rings 57 provides suitable contacts or electrical connections leading to and from the photosensitive cell 56 and the source of light within light shield 53. Shaft 50 may be rotated at a uniform rate by a motor 58 mounted within housing 10.

Referring to the Figures 4A and 4B there are shown, respectively, two graphs such as would be produced by the apparatus of the present invention when employed with the elements shown and described in conjunction with Fig. 5 of the aforementioned Hildebrandt Patent 2,614,334. In Figs. 4A and 4B the pips designated by numerals 60 result from light impinging upon the mirror 41 which is reflected and detected by the photosensitive cell. Numerals 61 are pips resulting from light being reflected from mirror 40 located on the bottom of major weight 25 and pips 62 are signals resulting from the reflections of light from mirror 42 located on minor mass 27. If there is no inclination the signals recorded will be like those shown in Fig. 4A where the pips 60 and 62 are each spaced from pip 61 by 90°. If the torsion constant of ribbon 24 is twice that of ribbon 23 and the instrument is inclined a particular angle the signal recorded might look like that shown in Fig. 4B where the spacing of pip 62 from pip 61 is twice the spacing of pip 60 from pip 61. From the spacing of pips 60 and 62 from pips 61 the actual amount of inclination can be ascertained.

From the foregoing it is clear that I have devised a new and useful inclinometer which is different in structure and operation from conventional inclinometers.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

What I wish to claim as new and useful and to secure by Letters Patent is:

1. In a means for indicating the direction of inclination: a housing; a rotatable elongated member mounted within said housing, the axis of said rotatable elongated member being substantially parallel to the sides of said housing; two axially spaced cross members mounted in said housing; a socket mounted on each of said cross members with one extremity of said rotatable elongated member disposed in one of said sockets and the other extremity of said rotatable elongated member disposed in the other of said sockets; a pair of axially spaced members extending from said rotatable elongated member; a flexible member connected to each of said axially spaced members and extending between said axially spaced members; and a weight connected to and radially spaced from said flexible member by flexible supporting means whereby said weight swings in the direction of the direction of inclination of said housing prior to rotation of said elongated member, said weight exerting a torque on said flexible member to twist said flexible member in an angular direction toward said direction of inclination.

2. An inclinometer including: a housing; a rotatable elongated member mounted within said housing, the axis of said rotatable elongated member being substantially parallel to the sides of said housing; a flexible member attached to said rotatable elongated member; a major weight connected to said flexible member which assumes the same direction as the direction of inclination of said housing; a second flexible member attached to said rotatable elongated member, said second flexible member being circumferentially spaced from said first flexible member; and a minor weight attached to said second flexible member, the azimuthal direction of said minor weight when compared to the azimuthal direction of said major weight giving an indication of the inclination of said housing.

3. An inclinometer including: a housing; a rotatable elongated member mounted within said housing, the axis of said rotatable elongated member being substantially parallel to the sides of said housing; a pair of axially spaced members extending from said rotatable elongated member; a first flexible member connected to each of said axially spaced members and extending between said axially spaced members; a second flexible member connected to each of said axially spaced members and extending between said axially spaced members and circumferentially spaced from said first flexible member, the torsion constant of said first flexible member being greater than the torsion constant of said second flexible member; a major weight attached to said first flexible member; and a minor weight attached to said second flexible member, whereby the azimuthal direction of the major weight indicates the direction of inclination of said housing and the azimuthal direction of said minor weight when compared to the azimuthal direction of said major weight gives an indication of the amount of inclination of said housing.

4. An inclinometer including: a housing; a rotatable elongated member mounted within said housing, the axis of said rotatable elongated member being substantially parallel to the sides of said housing; two axially spaced cross members mounted in said housing; a socket mounted on each of said cross members with one extremity of said rotatable elongated member disposed in one of said sockets and the other extremity of said rotatable elongated member disposed in the other of said sockets; a pair of axially spaced members extending from said rotatable elongated member; a first flexible member connected to each of said axially spaced members and extending between said axially spaced members; a second flexible member connected to each of said axially spaced members and extending between said axially spaced members and circumferentially spaced from said first flexible member, the torsion constant of said first flexible member being greater than the torsion constant of said second flexible member; a major weight attached to said first flexible member; and a minor weight atached to said second flexible member, whereby the azimuthal direction of the major weight indicates the direction of inclination of said housing and the azimuthal direction of said minor weight when compared to the azimuthal direction of said major weight gives an indication of the amount of inclination of said housing.

5. An inclinometer including: a housing; a rotatable elongated member mounted within said housing, the axis of said rotatable elongated member being substantially parallel to the sides of said housing; a flexible member attached to said rotatable elongated member; a major weight connected to said flexible member which assumes the same direction as the direction of inclination of said housing; a second flexible member attached to said rotatable elongated member, said second flexible member being circumferentially spaced from said first flexible member; a third flexible member attached to said rotatable elongated member and circumferentially spaced from each of said other flexible members, the torsion constant of said first flexible member being greater than the torsion constant of each of the other two flexible members; a minor weight attached to said second flexible member; and a minor weight attached to said third flexible member, the azimuthal directions of said minor weights when compared to the azimuthal direction of said major weight giving an indication of the inclination of said housing.

6. An inclinometer in accordance with claim 5 wherein the torsion constant of said second flexible member is greater than the torsion constant of said third flexible member.

7. An inclinometer including: a housing; a rotatable elongated member mounted within said housing, the axis of said rotatable elongated member being substantially parallel to the sides of said housing; a flexible member attached to said rotatable elongated member; a major weight connected to said flexible member which assumes the same direction as the direction of inclination of said housing; a second flexible member attached to said rotatable elongated member, said second flexible member being circumferentially spaced from said first flexible member; a third flexible member attached to said rotatable elongated member and circumferentially spaced from each of said other flexible members, the torsion constant of said first flexible member being greater than the torsion constant of each of the other two flexible members; a minor weight attached to said second flexible member; a minor weight attached to said third flexible member, the azimuthal directions of said minor weights when compared to the azimuthal direction of said major weight giving an indication of the inclination of said housing; and a guard member mounted on said rotatable elongated member between said two minor weights.

References Cited in the file of this patent

UNITED STATES PATENTS

| | | |
|---|---|---|
| 1,738,589 | Koppl | Dec. 10, 1929 |
| 2,362,616 | Cloud | Nov. 14, 1944 |
| 2,572,766 | Rylsky | Oct. 23, 1951 |
| 2,614,334 | Hildebrandt | Oct. 21, 1952 |
| 2,718,707 | Heintz et al. | Sept. 27, 1955 |